United States Patent [19]
Hunt

[11] 3,944,392
[45] Mar. 16, 1976

[54] CARBON BLACK REACTOR

[75] Inventor: Harold R. Hunt, Bartlesville, Okla.

[73] Assignee: Phillips Petroleum Company, Bartlesville, Okla.

[22] Filed: Jan. 28, 1974

[21] Appl. No.: 436,962

[52] U.S. Cl. ............... 23/259.5; 423/445; 423/450
[51] Int. Cl.² ...................... C09C 1/50; C09C 1/48
[58] Field of Search ........... 23/259.5; 423/450, 455, 423/456, 457, 458

[56] References Cited
UNITED STATES PATENTS

| | | | |
|---|---|---|---|
| 2,368,827 | 2/1945 | Hanson et al. | 23/259.5 |
| 2,420,999 | 4/1947 | Ayers | 23/259.5 |
| 3,410,660 | 11/1968 | Henderson et al. | 423/455 |

FOREIGN PATENTS OR APPLICATIONS

| | | | |
|---|---|---|---|
| 539,463 | 2/1956 | Italy | 423/456 |

Primary Examiner—Morris O. Wolk
Assistant Examiner—Roger F. Phillips
Attorney, Agent, or Firm—Neuman, Williams, Anderson & Olson

[57] ABSTRACT

Axial hydrocarbon oil feed surrounded by axial air is charged to a hemispherically-shaped inlet-end carbon black reactor. Hot combustion gases are added via an outer annulus surrounding the downstream end of the reactor. Product smoke is recovered via a central annular zone and passed to conventional recovery, after water quench, e.g. to filtration, wet pelleting and drying of the wet pellets.

2 Claims, 4 Drawing Figures

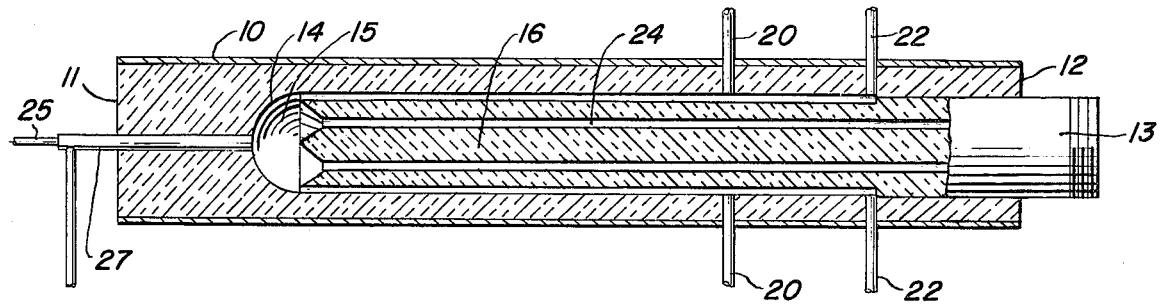
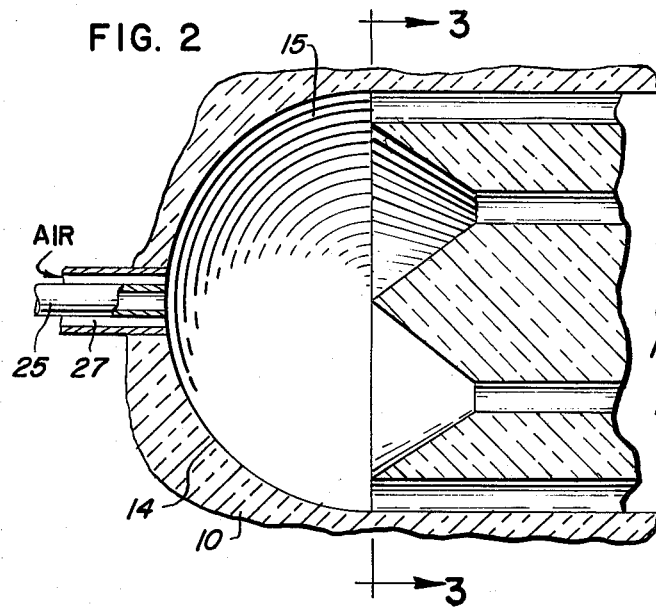
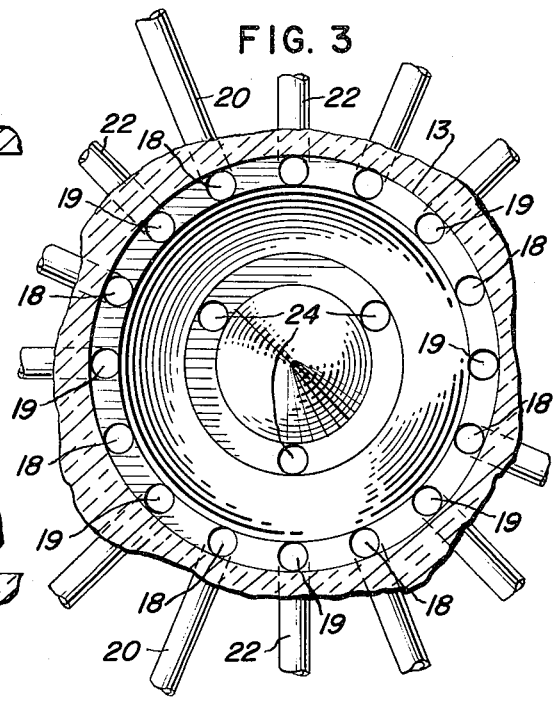
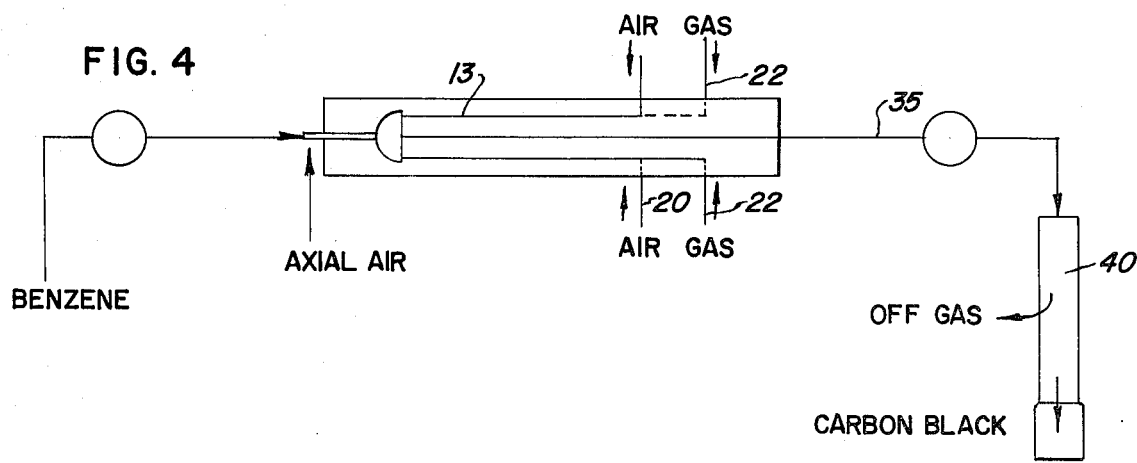

CARBON BLACK REACTOR

This invention relates to the production of carbon black. In one aspect, this invention relates to an improved carbon black furnace. In another aspect, this invention relates to a method of operating said furnace for the production of carbon black.

The production of carbon black in furnaces is well known with the carbon black being widely used in automotive tires as a reinforcing agent for the rubber used therein.

A principal object of this invention is to provide an improved carbon black furnace or reactor and methods of operating the same.

In accordance with this invention, there is provided a carbon black furnace comprising an elongated tubular housing having a closed upstream and a closed downstream end, an elongated reaction tube within said housing having an open downstream end and a closed curved upstream end defining a combustion chamber, said elongated reaction tube having annularly arranged tubes for admission of a combustible gas and air, and substantially centrally disposed passageways extending from said combustion chamber to the closed downstream end of the housing, a feed inlet extending through the upstream end of the housing and communicating with said combustion zone, annular air inlet means surrounding said feed inlet extending through the upstream end of the housing and communicating with said combustion zones, and coolant circulating means within the upstream and downstream ends of said housing.

The invention will now be further described in conjunction with the drawings wherein:

FIG. 1 is an illustration, partly in cross-section, of a carbon black reactor constructed in accordance with the invention.

FIG. 2 is a partial enlarged view showing in greater detail the combustion zone of the carbon black reactor and the feed inlet thereto.

FIG. 3 is a view taken on the line 3—3 of FIG. 2.

FIG. 4 is a schematic flow diagram for the production of carbon black.

Referring to the drawings, which represent one embodiment of a carbon black reactor in accordance with the invention, the numeral 10 denotes an elongated housing having a closed upstream end 11 and a closed downstream end 12. Extending horizontally within said housing is an elongated reactor tube 13 having at the upstream end thereof a concave surface 14. The surface is concave in the upstream direction. A preferred surface can be a hemispherically-shaped end closure 14. This end closure cross-section can be elliptical or parabolic in shape if desired.

Combustion zone 15 is formed by the curved closure member 14 and the refractory material 16 which occupies a substantial portion of reaction tube 13 and housing 10. Annularly disposed within reaction tube 13 are a plurality of air inlet tubes 18 and combustible gas inlet tubes 19. The tubes 18 and 19 are each connected to a supply source of air and combustible gas by inlets; two such air supply inlets 20 and two combustible gas inlets 22 being shown in FIG. 1.

Centrally disposed within reaction tube 13 are reaction tubes or exhaust passages 24 which extend substantially from combustion zone 15 to the downstream end of the tube 13. These passages can be in any configuration, including an annular or a single axially located conduit. A feed inlet 25 extends through the upstream end of the housing 10 and communicates with combustion zone 15. An annular air passage 27 around feed inlet 25 also extends through the housing and to combustion zone 15. By this arrangement a carbon black hydrocarbon feed and air are axially introduced into the combustion zone 15 where they are contacted with hot combustion gas resulting from combustion between air and fuel introduced through tubes 18 and 19. The combustion gases impinge on the hemispherically-shaped end closure 14 and are directed inwardly toward the hydrocarbon feed within combustion zone 15.

The feed inlet 25 can be surrounded by a water jacket (not shown) through which water can be circulated to prevent coking of the hydrocarbon feed prior to its introduction into combustion zone 15. Similarly, heat exchange means (not shown) can be used to cool the off gases as at 40.

From the foregoing description it will be appreciated that the air and gas introduced through inlets 20 and 22 receive heat from the outgoing gases passing through exhaust passages 24.

In a typical operation a suitable hydrocarbon feed such as benzene is introduced into combustion zone 15 at a rate of 1200 cubic centimeters per hour through feed inlet 25 having an outer dimension of one-half inch. Air at a rate of 24 standard cubic feed per hour is introduced through annulus 27, which is the radial distance between the two walls of 0.0275 inch. The radius of combustion zone 15 is approximately 2 inches. A fuel gas such as methane is introduced through ¼ inch O.D. tubes 18 at a rate of 36 standard cubic feet per hour while combustion air is introduced through similarly sized tubes 19 at a rate of 432 standard cubic feet per hour. The combustion gases are fed at a temperature of about 2800° to 3600° F. The dimensions of housing 10 are 6 inches in diameter by 36 inches in length, and the length of reactor tube 13 is 39 inches. Range of reaction zone pressure is ½ to 3 psig generally.

Carbon black smoke exits through three ⅜ inch diameter passages 24 at a rate of 475 standard cubic feet per hour and is then passed through conduit 35 for recovery of the carbon black particles by any suitable means at 40.

In a typical plant size operation, the smoke removal passages 24 will have a cross-sectional area of about 38 square inches and a length of about 10 feet to the quench locus. The make oil 25 feed rate will be about 1200 pounds per hour, axial air 27 will be about 11,000 SCF/hour, the fuel gas will be about 17,000 SCF/hour, and combustion air will be about 200,000 SCF/hour. (SCF is standard cubic feet.) The radius of the combustion zone 15 will be about 15.5 inches.

A typical carbon black made in the first-described reactor had the following properties:

| | |
|---|---|
| $N_2SA^{(1)}$ M²/gm | 182 |
| $CTAB^{(2)}$ M²/gm | 144 |
| DBP (24M4)³, cc/100 gm | 100 |

(1)Nitrogen Surface Area: ASTM D 3037-71T (Method A)
(2)Rubber Chemistry and Technology, Vol. 44, No. 5, December 1971, pages 1287–1296
(3)U.S. 3,548,454 and measured by Method B, ASTM D 2414-70, after sample is crushed.

Those modifications and equivalents which fall within the spirit of the invention are to be considered a part thereof.

What is claimed is:

1. A carbon black reactor comprising an elongated tubular housing having a closed upstream and a closed downstream end, an elongated reaction tube within said housing having an open downstream end and a closed concave upstream end defining a combustion chamber in the upstream end of the reactor, said elongated reaction tube having annularly arranged tubes extending to said combustion chamber whereby a combustible gas and air are admitted to and impinge upon the concave upstream end of said combustion chamber, and substantially centrally disposed passageway means extending from said combustion chamber to the closed downstream end of the housing for withdrawing carbon black smoke, a feed inlet extending through the upstream end of the housing and communicating with said combustion zone, and annular air inlet means surrounding said feed inlet extending through the upstream end of the housing and communicating with said combustion zones.

2. A carbon black reactor in accordance with claim 1 wherein the substantially centrally disposed means for withdrawing carbon black smoke comprise a plurality of axially extending passageways.

* * * * *